(12) United States Patent
Itoh

(10) Patent No.: US 7,561,344 B2
(45) Date of Patent: Jul. 14, 2009

(54) ZOOM LENS SYSTEM AND IMAGE PICKUP APPARATUS INCLUDING THE SAME

(75) Inventor: Yoshinori Itoh, Shimotsuke (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/138,173

(22) Filed: Jun. 12, 2008

(65) Prior Publication Data

US 2008/0310032 A1    Dec. 18, 2008

(30) Foreign Application Priority Data

Jun. 14, 2007   (JP)   ............... 2007-157265

(51) Int. Cl.
G02B 15/14    (2006.01)

(52) U.S. Cl. ............. 359/687; 359/676; 348/240.3

(58) Field of Classification Search ............... 359/687, 359/676–678, 683–686; 396/72–88; 348/240.99–240.3, 348/335–369

See application file for complete search history.

(56) References Cited

U.S. PATENT DOCUMENTS

| 6,069,743 | A | 5/2000 | Nagata et al. |
| 6,577,450 | B2 | 6/2003 | Hamano et al. |
| 6,853,496 | B2 | 2/2005 | Eguchi |
| 6,975,461 | B2 | 12/2005 | Eguchi |

FOREIGN PATENT DOCUMENTS

JP    03-296706 A    12/1991

Primary Examiner—Darryl J Collins
(74) Attorney, Agent, or Firm—Canon USA Inc IP Div

(57) ABSTRACT

A simple, compact, high-zoom-ratio zoom lens system exhibiting high optical performance at all zoom positions is provided. The system includes, in order from the object side to the image side, first to fourth lens groups having positive, negative, positive, and positive refractive powers, respectively. The first-to-second-lens-group distance becomes the smallest during zooming. The first lens group resides closer to the object at a telephoto end than at a wide-angle end. The lens groups move such that the second-to-third-lens-group distance is smaller and the third-to-fourth-lens-group distance is larger at the telephoto end than at the wide-angle end. The second lens group includes, in order from the object side to the image side, negative and positive lens elements. First-to-second-lens-group distances d1w and d1t at the wide-angle end and at the telephoto end, respectively, and the smallest first-to-second-lens-group distance d1min obtained during zooming are appropriately set.

11 Claims, 17 Drawing Sheets

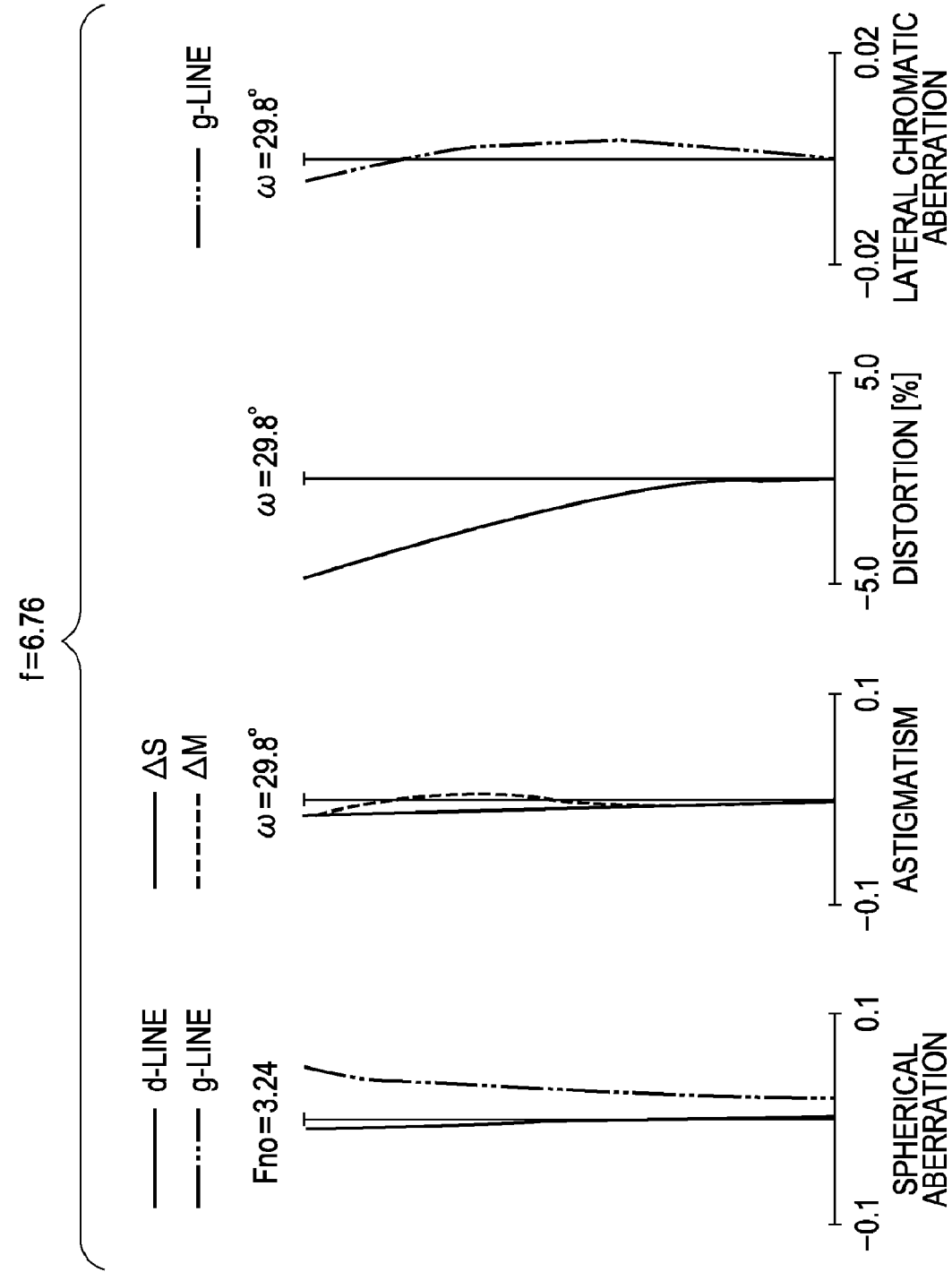

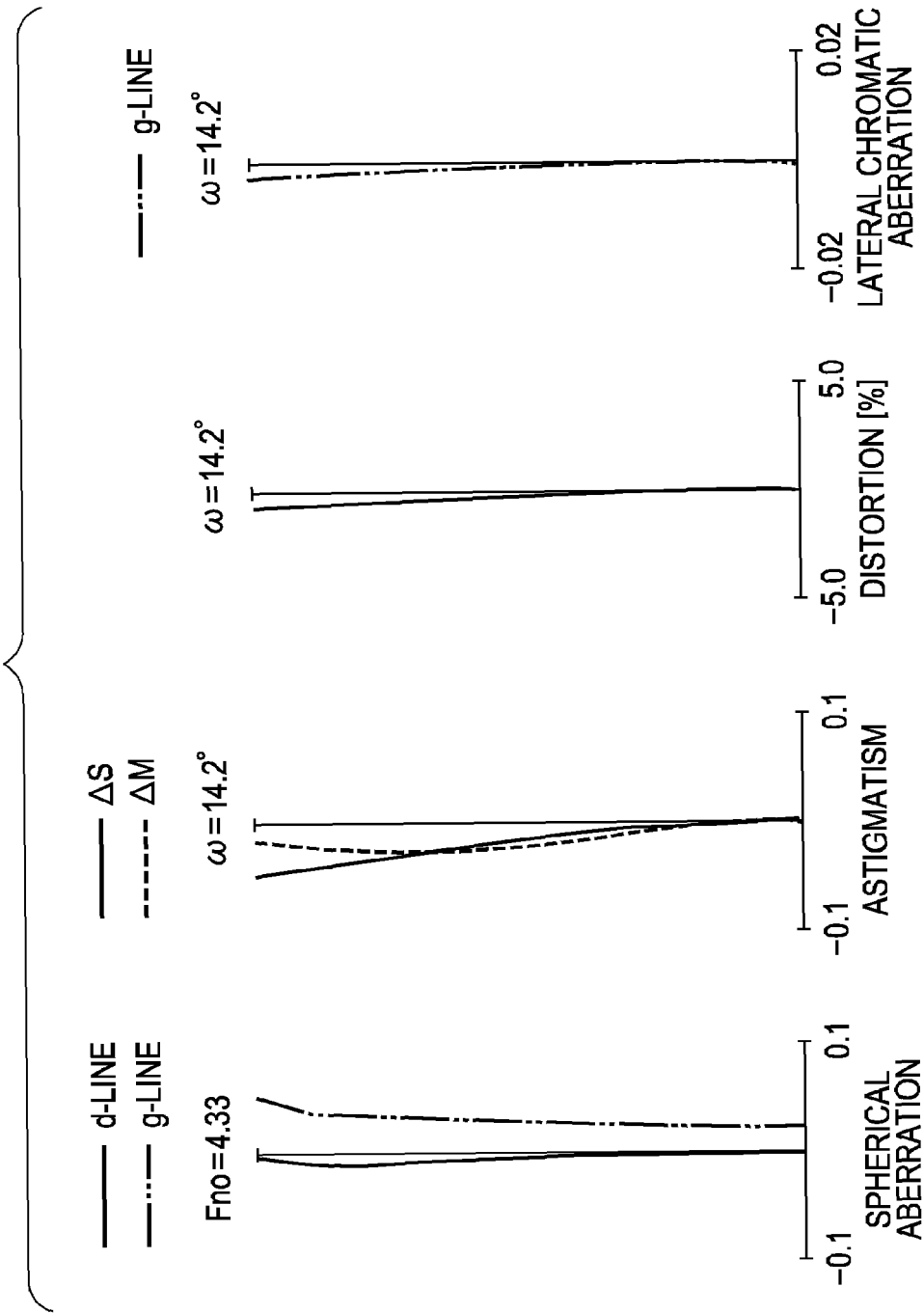

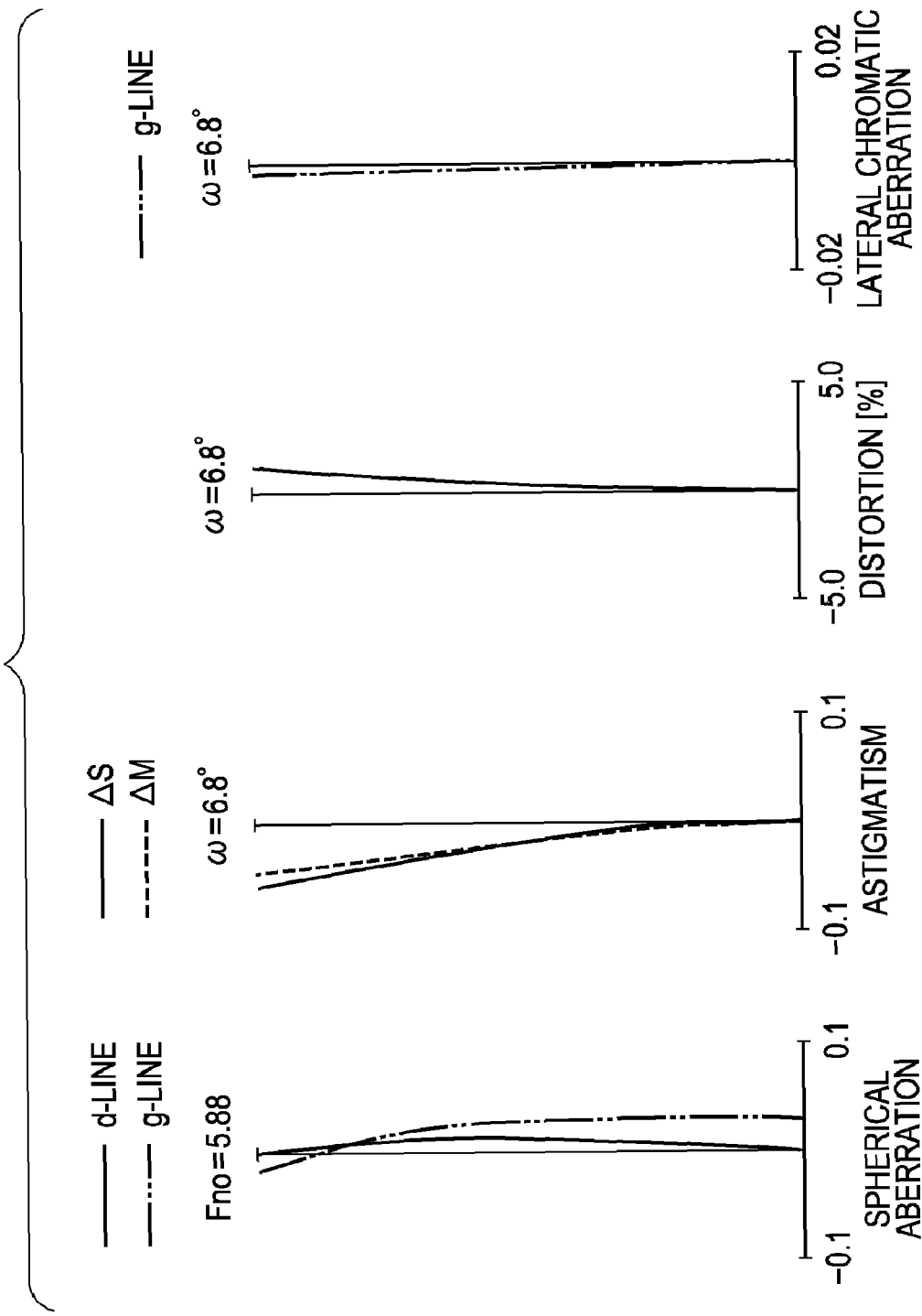

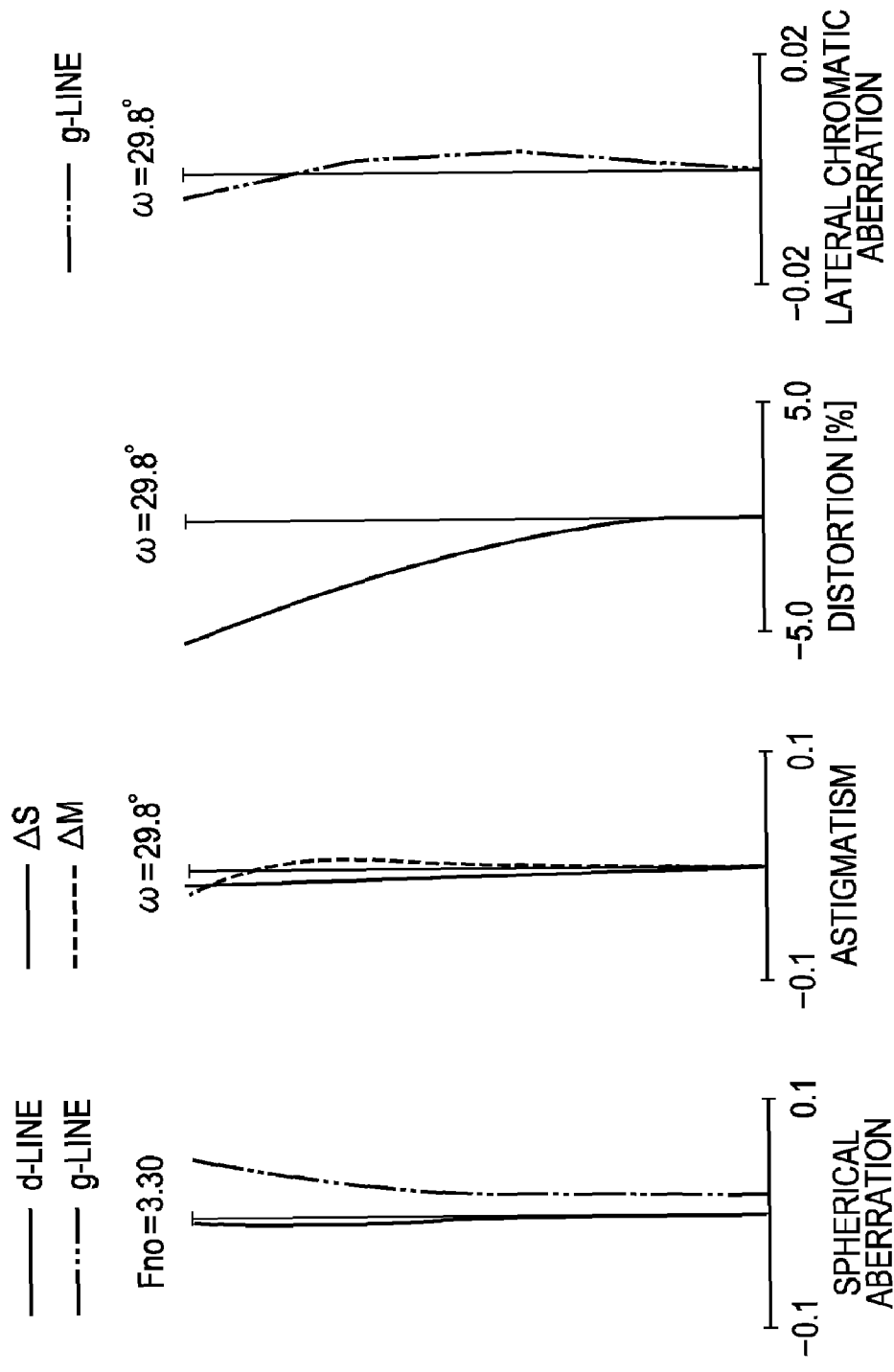

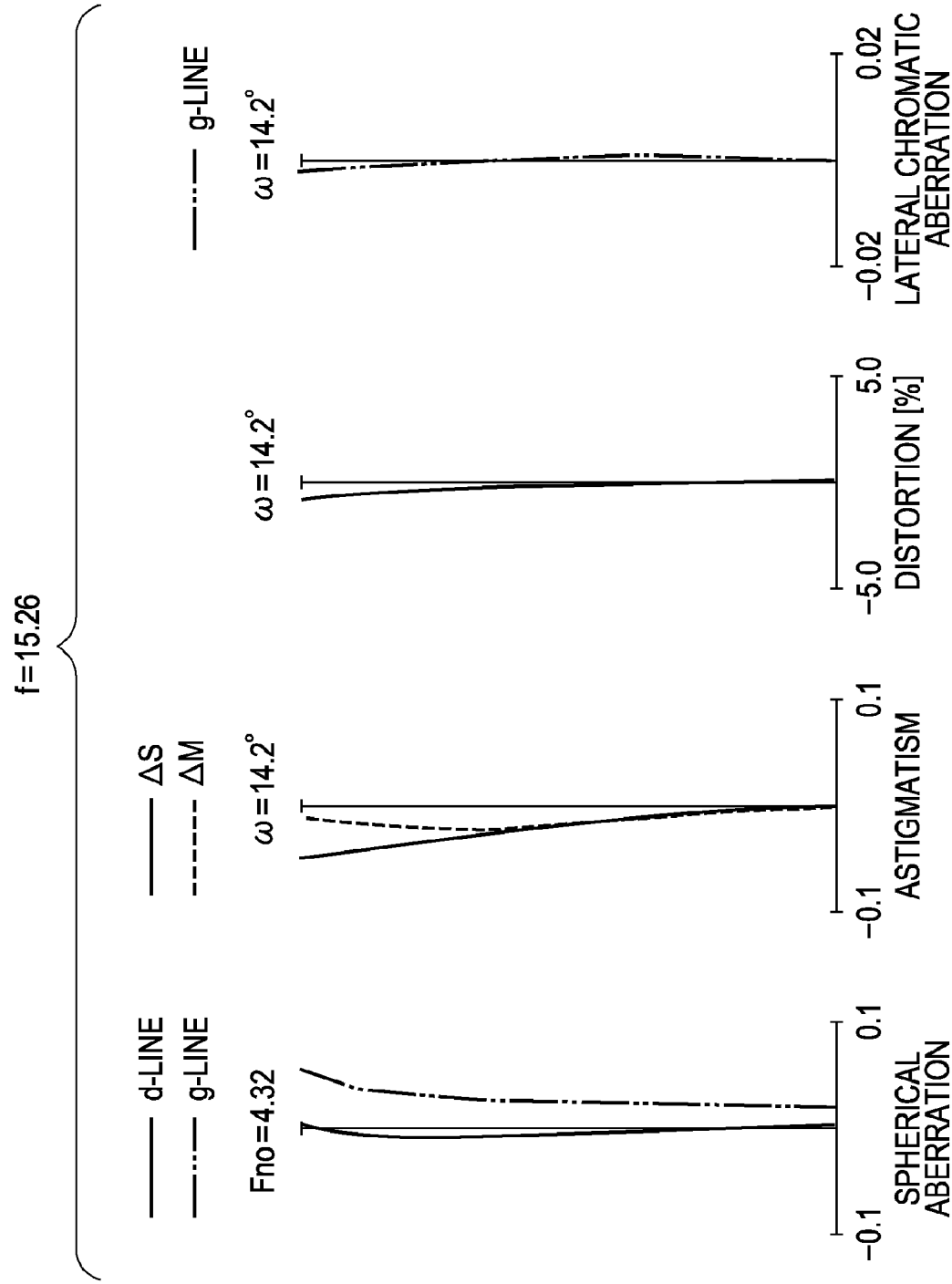

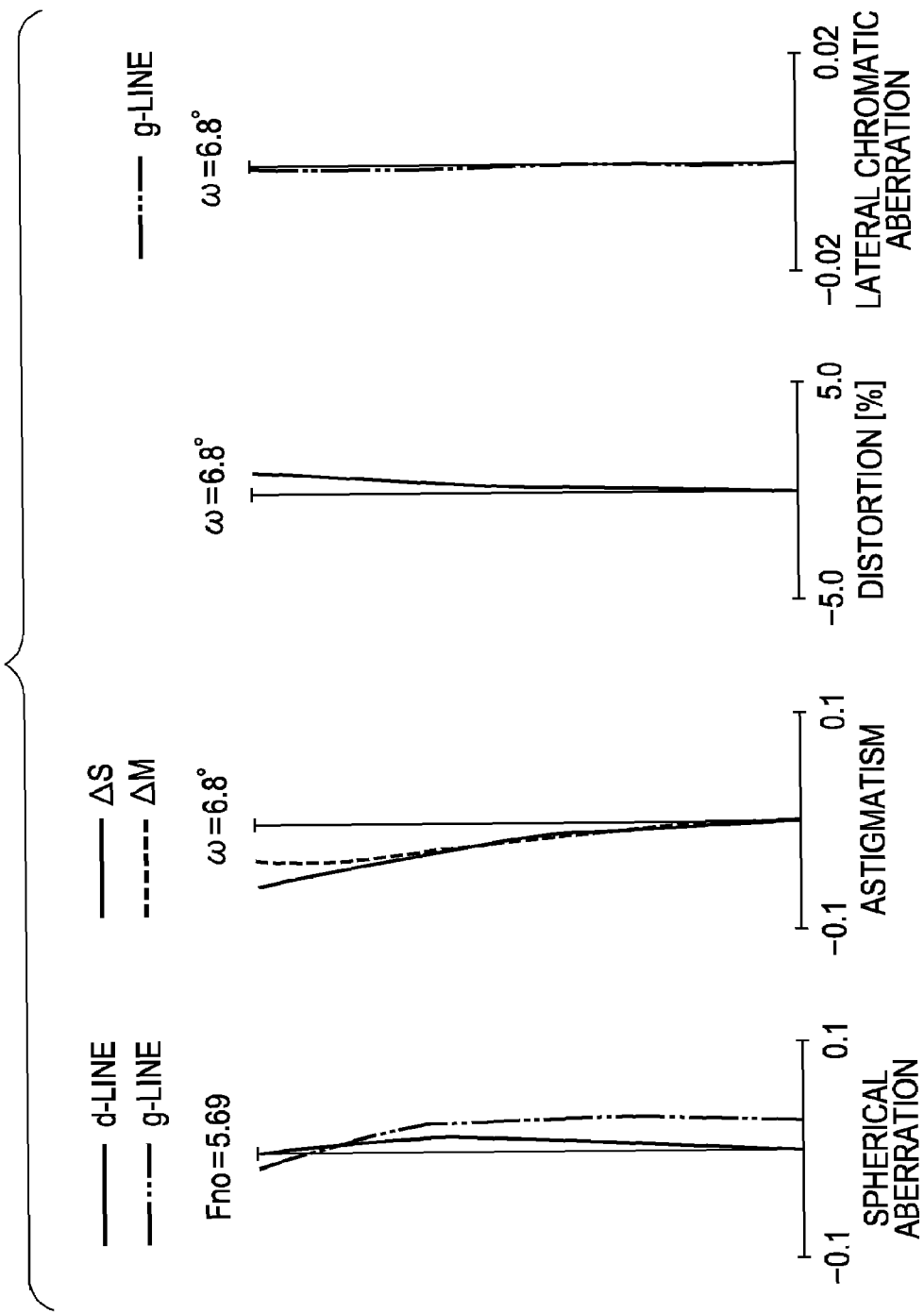

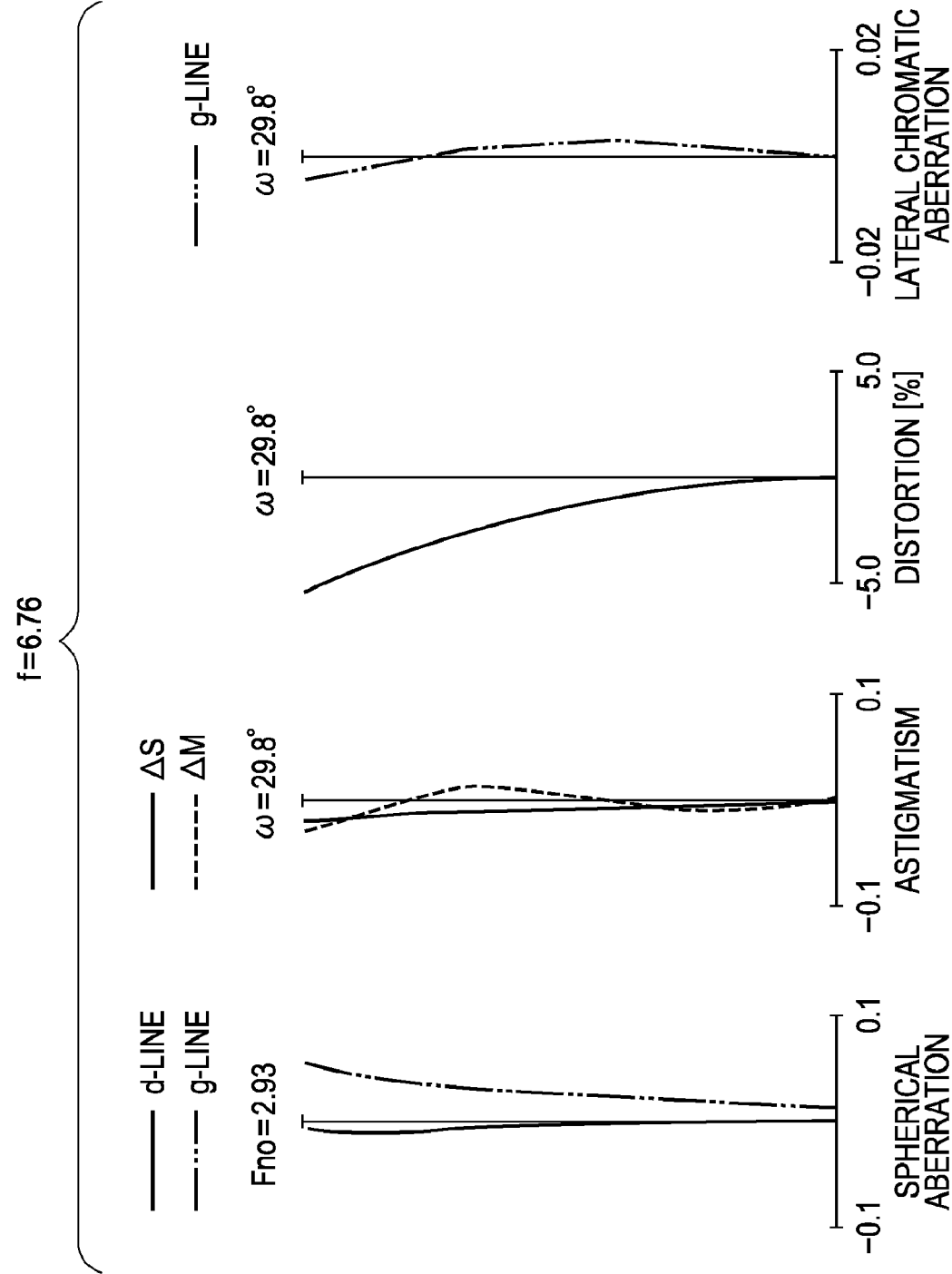

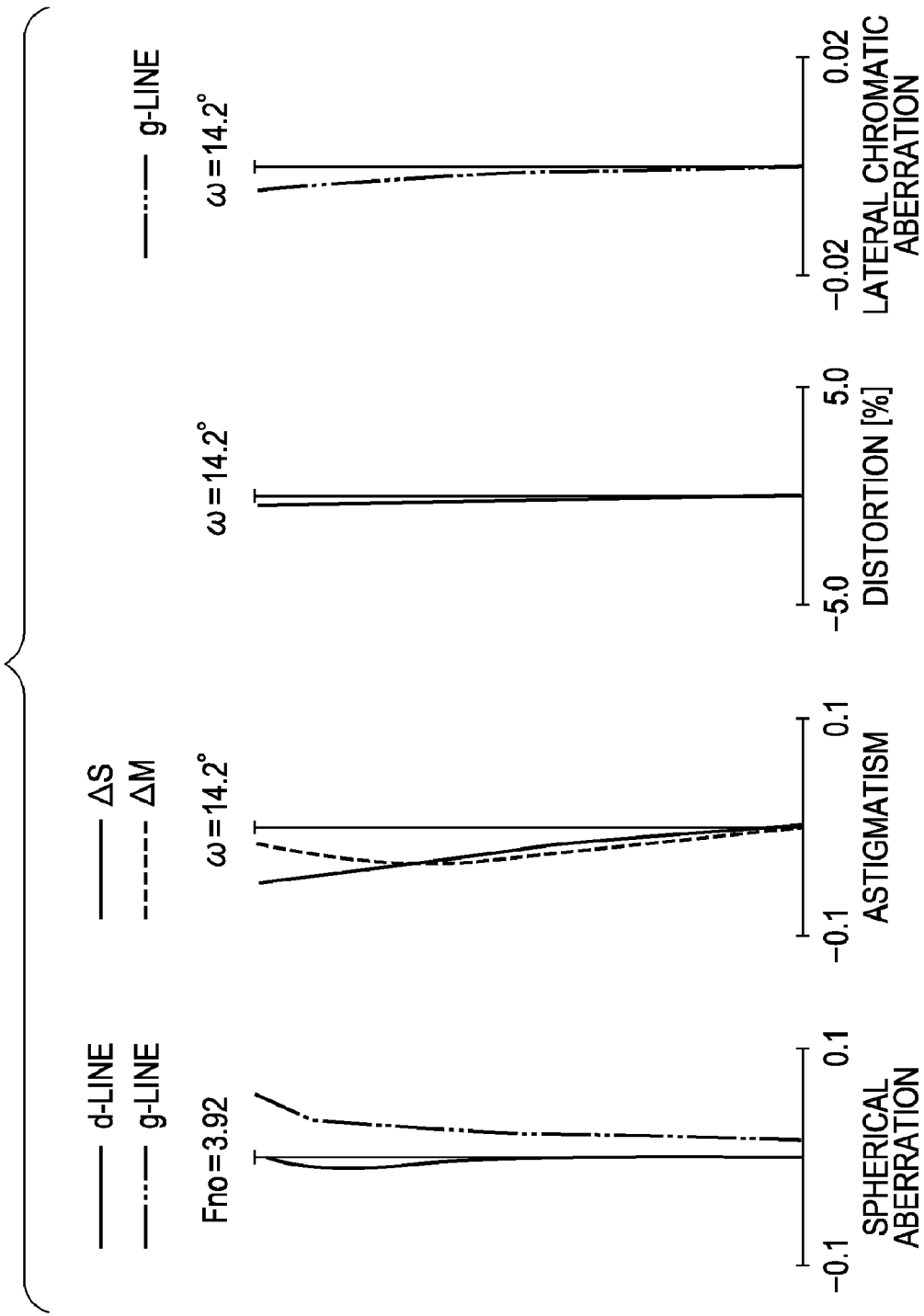

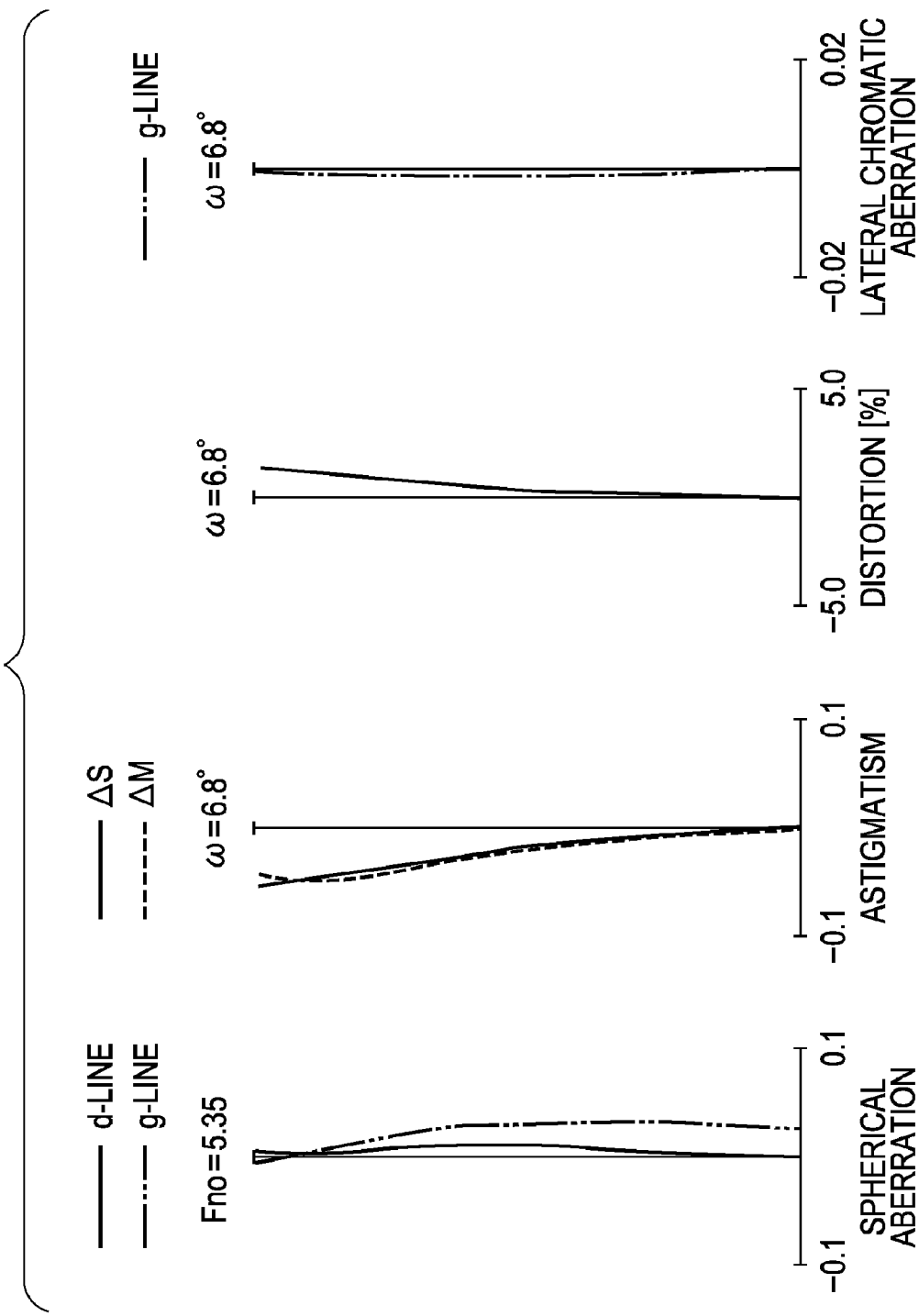

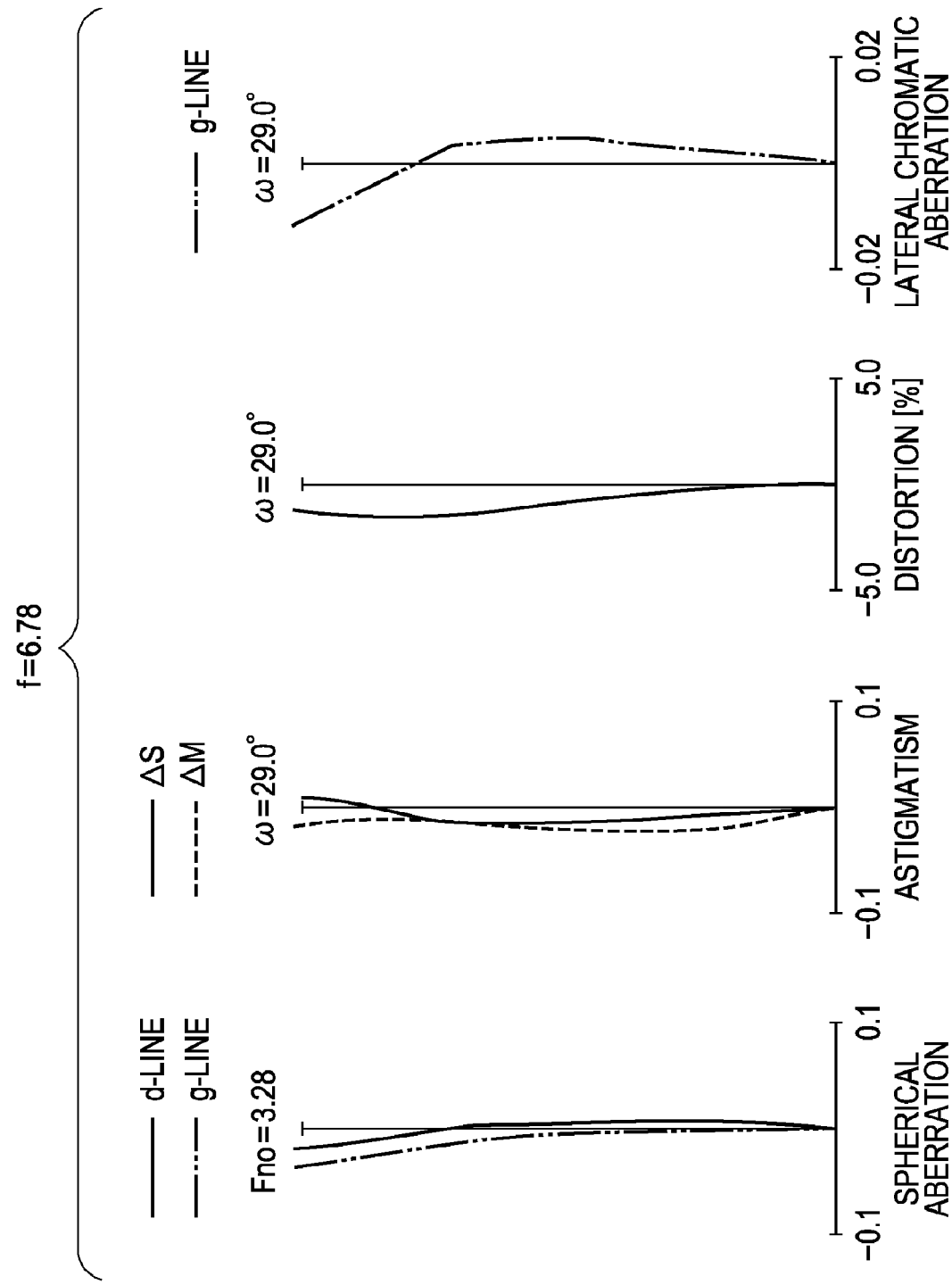

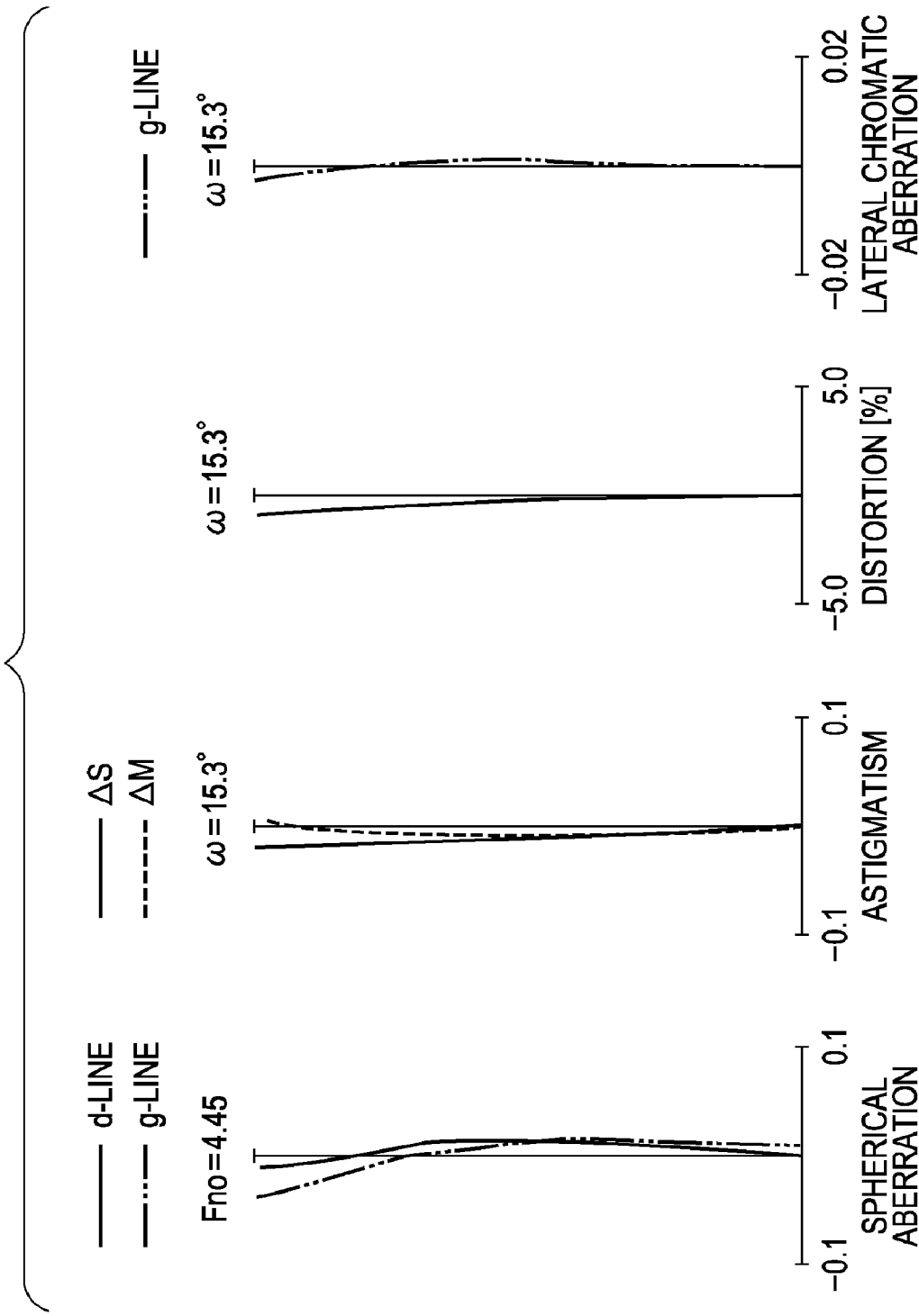

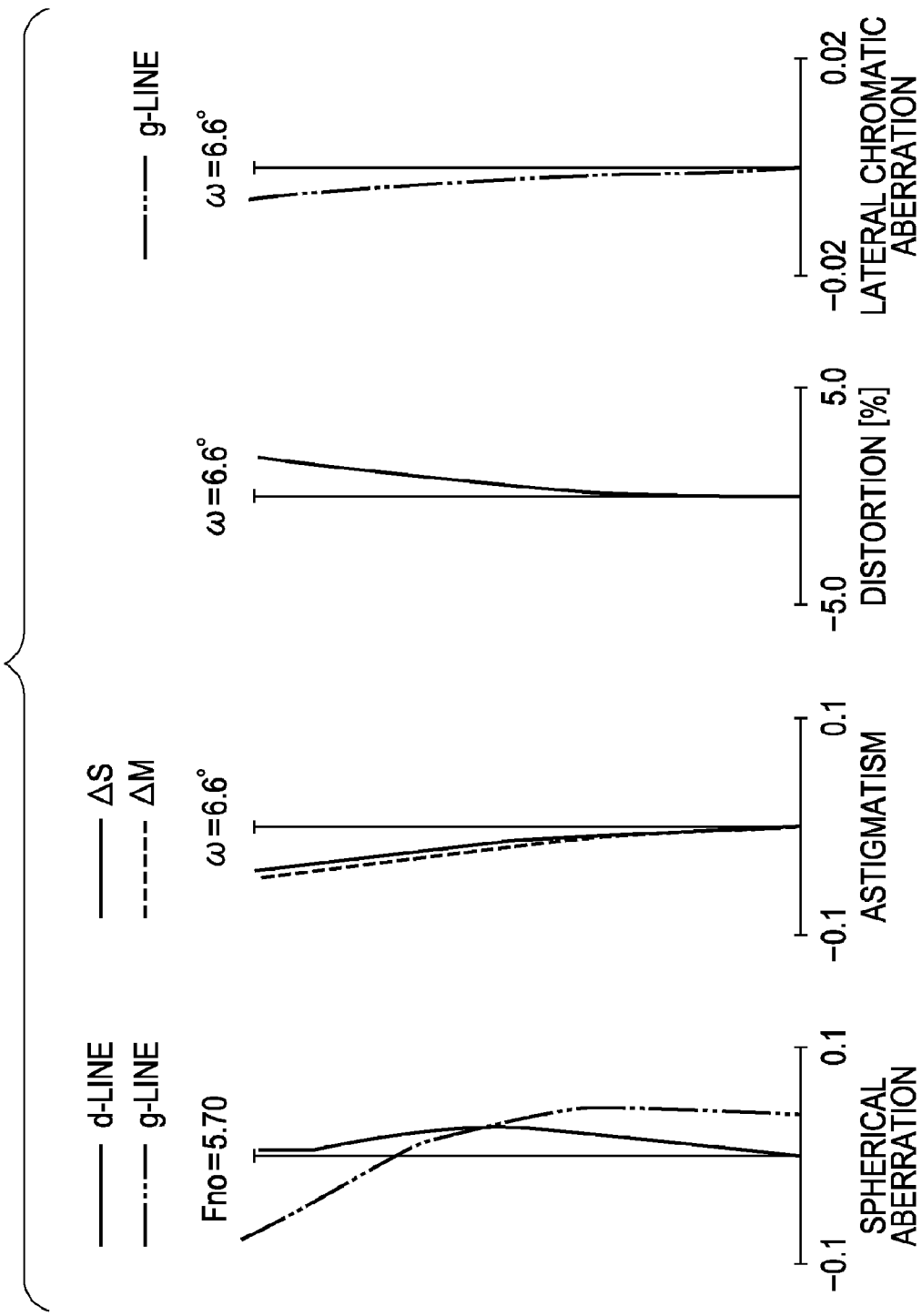

ZOOM LENS SYSTEM AND IMAGE PICKUP APPARATUS INCLUDING THE SAME

BACKGROUND OF THE INVENTION

1. Field of the Invention

The present invention relates to zoom lens systems suitable for cameras such as video cameras, silver-halide-film cameras, broadcast cameras, and digital still cameras, and to image pickup apparatuses including the same.

2. Description of the Related Art

Recent image pickup apparatuses, such as video cameras, digital still cameras, broadcast cameras, and silver-halide-film still cameras, that include solid-state image pickup devices have higher functions and are of smaller sizes.

Image taking optical systems included in such image pickup apparatuses are desired to be compact lens systems with a short total length and a high zoom ratio and to exhibit good optical performance at all zoom positions.

For example, Japanese Patent Laid-Open No. 3-296706 and U.S. Pat. Nos. 6,975,461 and 6,853,496 disclose compact four-group zoom lens systems that have a high zoom ratio and perform zooming by moving individual lens groups provided with refractive powers of positive, negative, positive, and positive in that order from the object side to the image side.

Additionally, U.S. Pat. Nos. 6,069,743 and 6,577,450 disclose four-group zoom lens systems each of which includes a second lens group consisting of a pair of a negative lens element and a positive lens element.

In general, a zoom lens system that includes lens groups each including a larger number of lens elements has a long optical axis for each of the lens groups.

Moreover, a zoom lens system that includes lens groups that move large distances during zooming and focusing has a long total length.

When the refractive power of each lens group is increased to reduce the size of the zoom lens system, the moving distance of each lens group during zooming is reduced, whereby the total length can be reduced. However, a simple increase of the refractive power of the lens group increases changes in aberrations during zooming. It is difficult to compensate for such aberrations in a good manner.

That is, to simultaneously achieve compactness, a high zoom ratio, and good optical performance of an optical system, it is important to appropriately set the moving conditions during zooming, refractive powers, and configurations of individual lens groups.

SUMMARY OF THE INVENTION

The present invention provides a zoom lens system that has a high zoom ratio and a simple, compact lens configuration while exhibiting high optical performance at all zoom positions.

According to an aspect of the invention, a zoom lens system includes, in order from an object side to an image side, a first lens group having a positive refractive power, a second lens group having a negative refractive power, a third lens group having a positive refractive power, and a fourth lens group having a positive refractive power. A distance between the first lens group and the second lens group becomes the smallest at a halfway point during zooming. The first lens group is positioned closer to the object side at a telephoto end than at a wide-angle end. The first to fourth lens groups move in such a manner that a distance between the second lens group and the third lens group is smaller and a distance between the third lens group and the fourth lens group is larger at the telephoto end than at the wide-angle end. The second lens group consists of, in order from the object side to the image side, a negative lens element and a positive lens element. In this zoom lens system, the following condition is satisfied:

$$10 < (d1t - d1\min)/(d1w - d1\min) < 90$$

where $d1w$ and $d1t$ denote distances between the first lens group and the second lens group at the wide-angle end and at the telephoto end, respectively, and $d1\min$ denotes the smallest distance between the first lens group and the second lens group, $d1\min$ being obtained at a halfway point during zooming.

Further features of the present invention will become apparent from the following description of exemplary embodiments with reference to the attached drawings.

BRIEF DESCRIPTION OF THE DRAWINGS

FIG. 2A is a diagram showing aberrations of the zoom lens system according to the first embodiment at a wide-angle end.

FIG. 2B is a diagram showing aberrations of the zoom lens system according to the first embodiment at an intermediate zoom position.

FIG. 2C is a diagram showing aberrations of the zoom lens system according to the first embodiment at a telephoto end.

FIG. 4A is a diagram showing aberrations of the zoom lens system according to the second embodiment at a wide-angle end.

FIG. 4B is a diagram showing aberrations of the zoom lens system according to the second embodiment at an intermediate zoom position.

FIG. 4C is a diagram showing aberrations of the zoom lens system according to the second embodiment at a telephoto end.

FIG. 6A is a diagram showing aberrations of the zoom lens system according to the third embodiment at a wide-angle end.

FIG. 6B is a diagram showing aberrations of the zoom lens system according to the third embodiment at an intermediate zoom position.

FIG. 6C is a diagram showing aberrations of the zoom lens system according to the third embodiment at a telephoto end.

FIG. 8A is a diagram showing aberrations of the zoom lens system according to the fourth embodiment at a wide-angle end.

FIG. 8B is a diagram showing aberrations of the zoom lens system according to the fourth embodiment at an intermediate zoom position.

FIG. 8C is a diagram showing aberrations of the zoom lens system according to the fourth embodiment at a telephoto end.

DESCRIPTION OF THE EMBODIMENTS

Zoom lens systems according to embodiments of the present invention each include, in order from the object side to the image side, a first lens group having a positive refractive power, a second lens group having a negative refractive power, a third lens group having a positive refractive power, and a fourth lens group having a positive refractive power.

The distance between the first lens group and the second lens group becomes the smallest at a halfway point during zooming.

The first lens group is positioned closer to the object side at a telephoto end than at a wide-angle end. In this zoom lens system, the lens groups move during zooming in such a manner that the distance between the second lens group and the third lens group is smaller and the distance between the third lens group and the fourth lens group is larger at the telephoto end than at the wide-angle end.

Figure 1A:
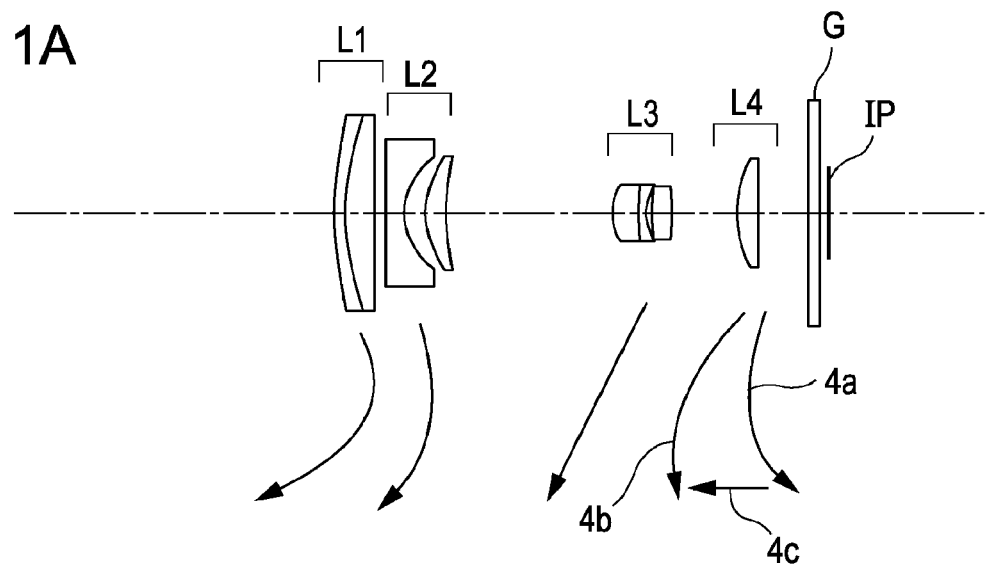
FIG. 1A is a sectional view of a zoom lens system according to a first embodiment of the present invention.
Figure 1B:
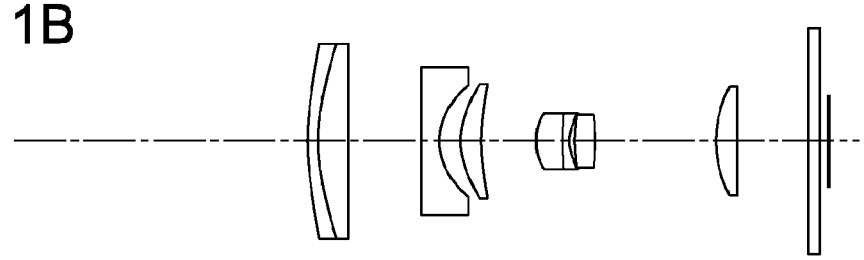
FIG. 1B is another sectional view of the zoom lens system according to the first embodiment.
Figure 1C:
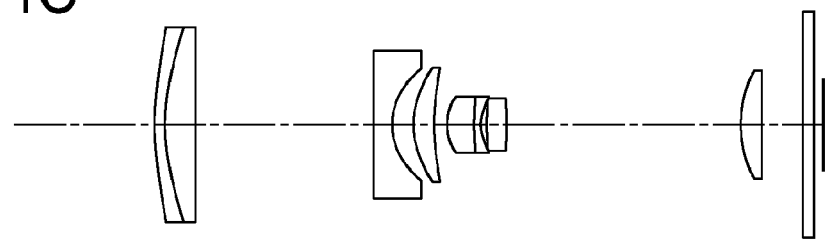
FIG. 1C is another sectional view of the zoom lens system according to the first embodiment.

FIGS. 1A to 1C are sectional views of a zoom lens system according to a first embodiment of the present invention. FIGS. 2A to 2C are diagrams showing aberrations of the zoom lens system according to the first embodiment at the wide-angle end (short-focal-length end), at an intermediate zoom position, and at the telephoto end (long-focal-length end), respectively. The zoom lens system of the first embodiment has a zoom ratio of 4.76 and an f-number of 3.25 to 5.88.

Figure 3A:
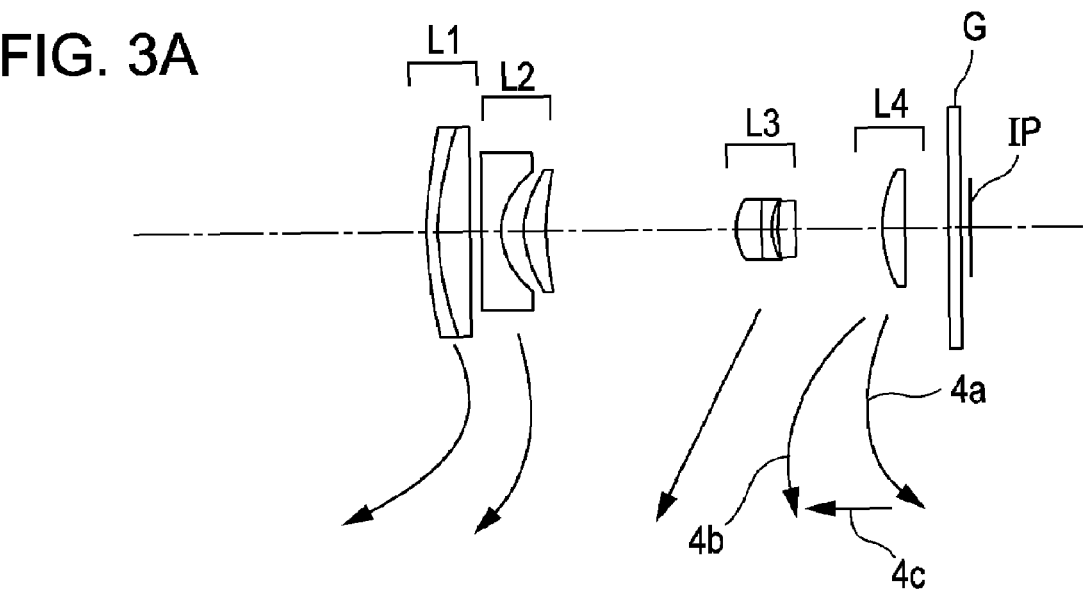
FIG. 3A is a sectional view of a zoom lens system according to a second embodiment of the present invention.
Figure 3B:
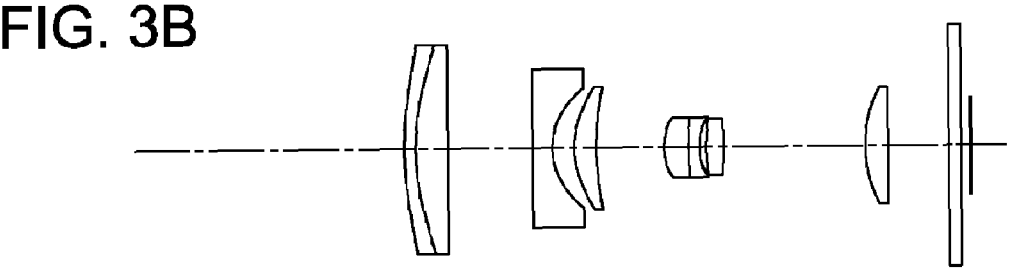
FIG. 3B is another sectional view of the zoom lens system according to the second embodiment.
Figure 3C:
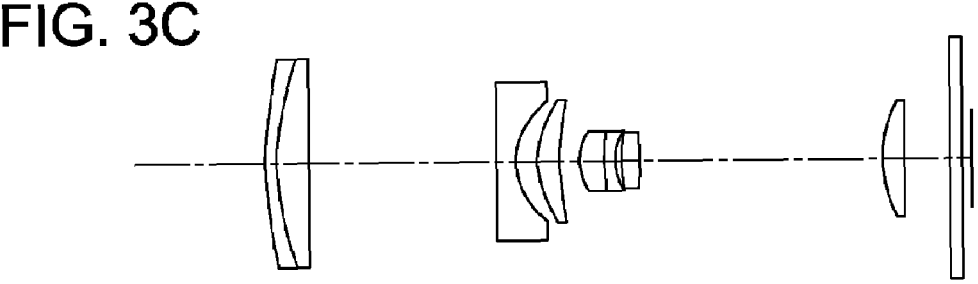
FIG. 3C is another sectional view of the zoom lens system according to the second embodiment.

FIGS. 3A to 3C are sectional views of a zoom lens system according to a second embodiment of the present invention. FIGS. 4A to 4C are diagrams showing aberrations of the zoom lens system according to the second embodiment at the wide-angle end, at an intermediate zoom position, and at the telephoto end, respectively. The zoom lens system of the second embodiment has a zoom ratio of 4.79 and an f-number of 3.30 to 5.70.

Figure 5A:
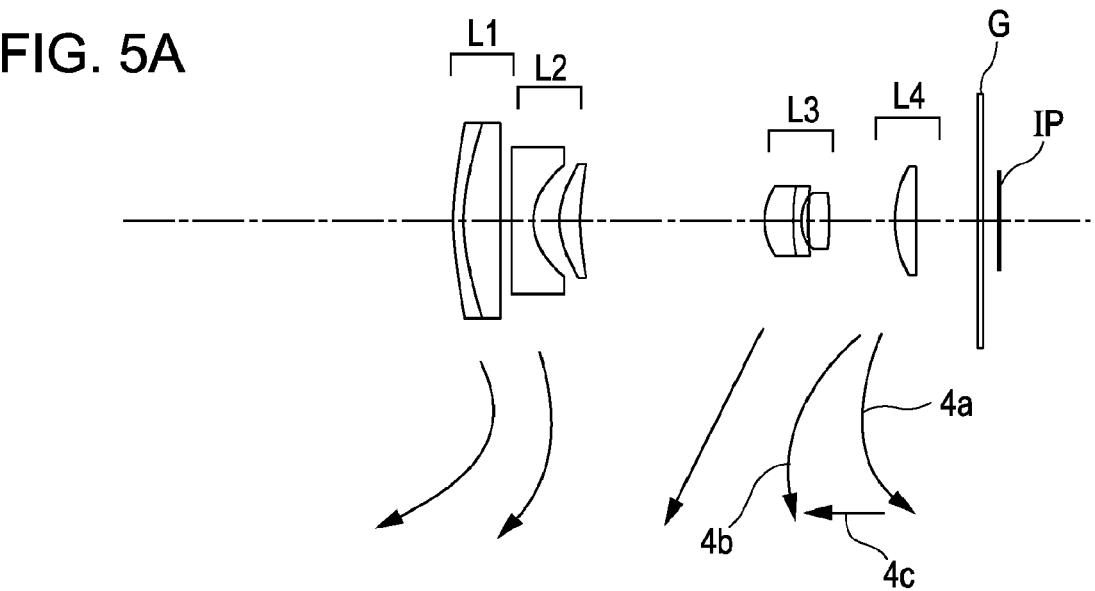
FIG. 5A is a sectional view of a zoom lens system according to a third embodiment of the present invention.
Figure 5B:
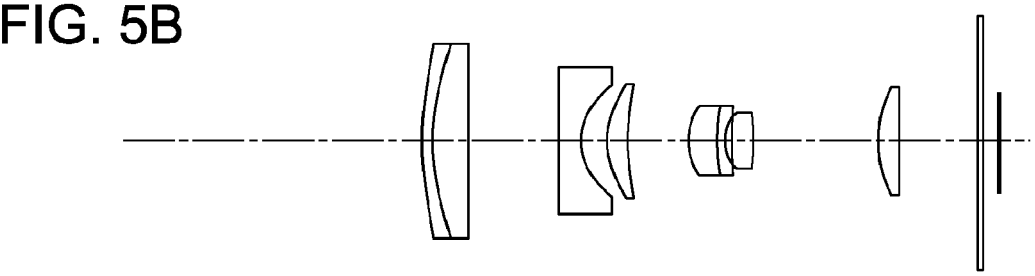
FIG. 5B is another sectional view of the zoom lens system according to the third embodiment.
Figure 5C:
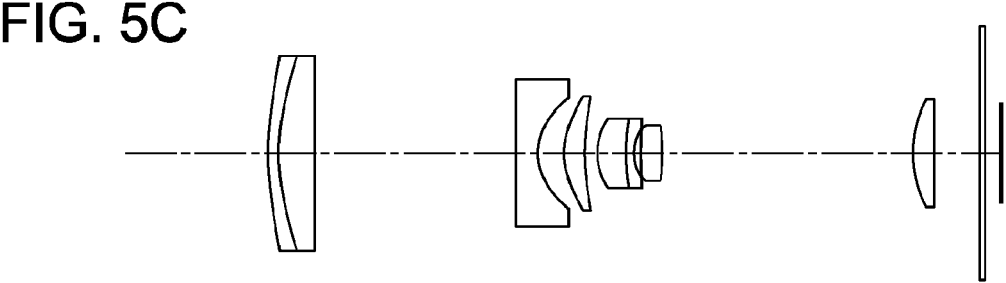
FIG. 5C is another sectional view of the zoom lens system according to the third embodiment.

FIGS. 5A to 5C are sectional views of a zoom lens system according to a third embodiment of the present invention. FIGS. 6A to 6C are diagrams showing aberrations of the zoom lens system according to the third embodiment at the wide-angle end, at an intermediate zoom position, and at the telephoto end, respectively. The zoom lens system of the third embodiment has a zoom ratio of 4.79 and an f-number of 2.93 to 5.36.

Figure 7A:
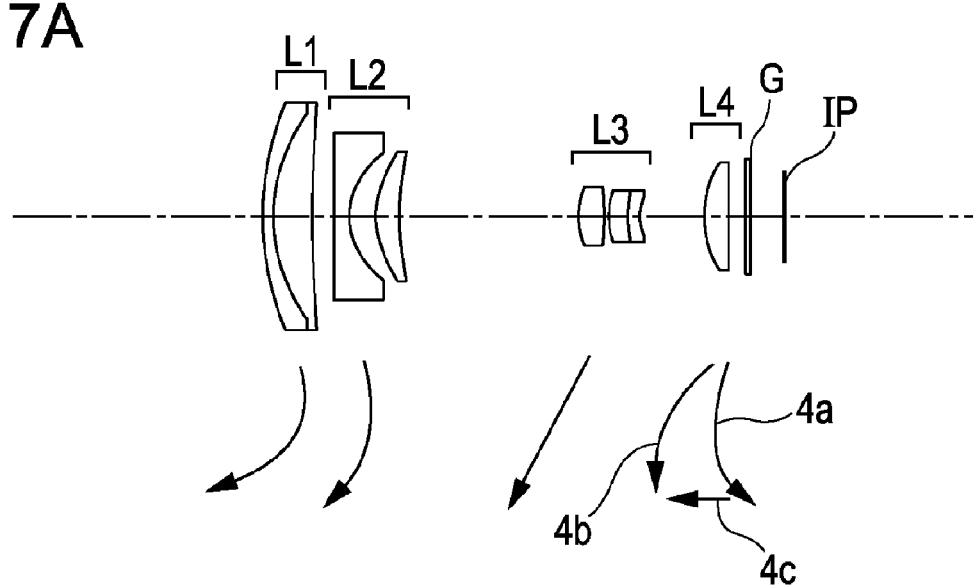
FIG. 7A is a sectional view of a zoom lens system according to a fourth embodiment of the present invention.
Figure 7B:
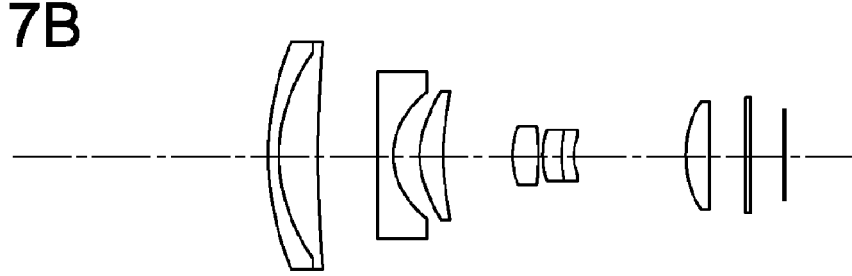
FIG. 7B is another sectional view of the zoom lens system according to the fourth embodiment.
Figure 7C:
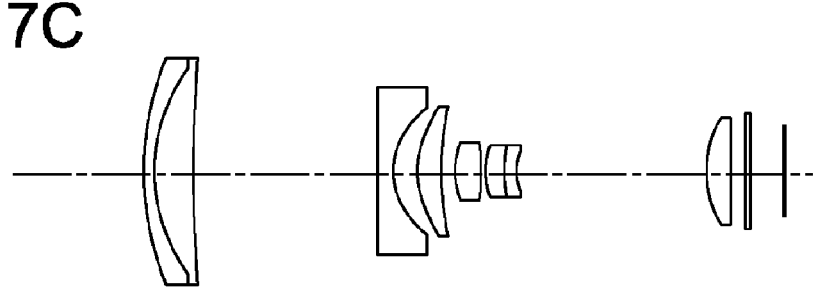
FIG. 7C is another sectional view of the zoom lens system according to the fourth embodiment.

FIGS. 7A to 7C are sectional views of a zoom lens system according to a fourth embodiment of the present invention. FIGS. 8A to 8C are diagrams showing aberrations of the zoom lens system according to the fourth embodiment at the wide-angle end, at an intermediate zoom position, and at the telephoto end, respectively. The zoom lens system of the fourth embodiment has a zoom ratio of 4.77 and an f-number of 3.28 to 5.71.

FIGS. 1A, 3A, 5A, and 7A each show the lens position at the wide-angle end, FIGS. 1B, 3B, 5B, and 7B each show the lens position at an intermediate zoom position, and FIGS. 1C, 3C, 5C, and 7C each show the lens position at the telephoto end.

Figure 9:
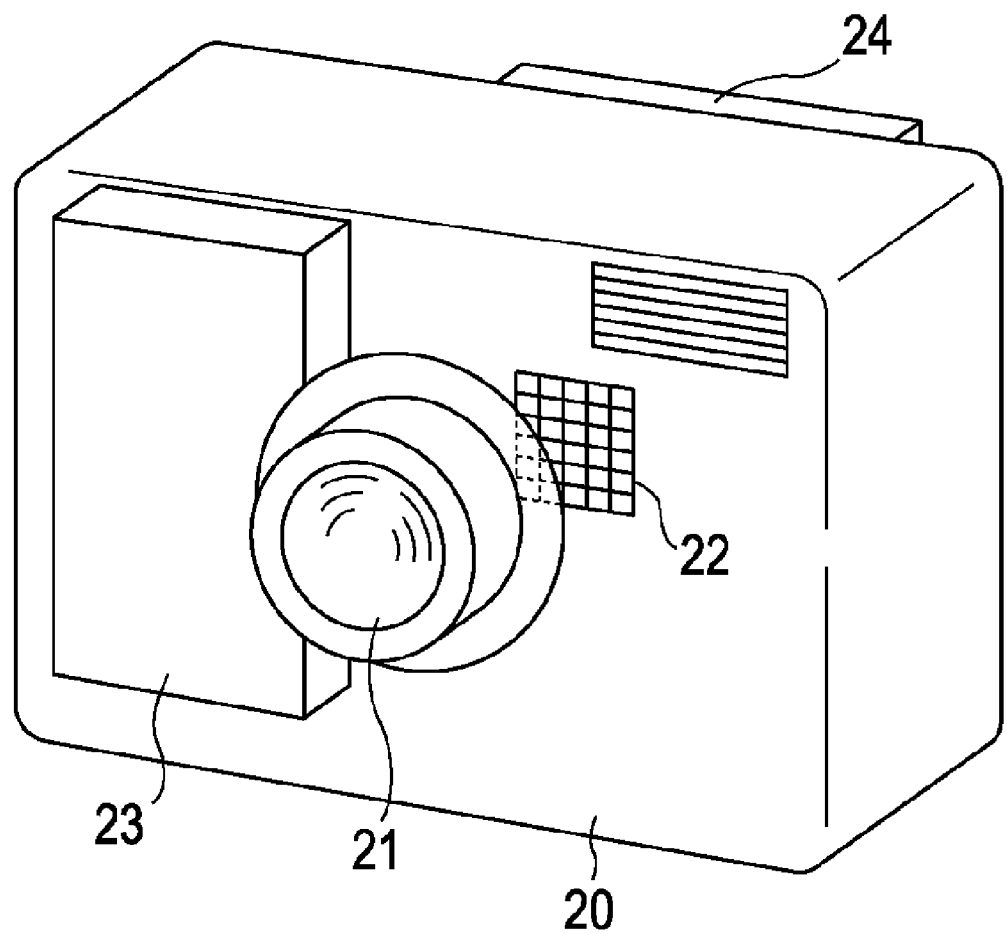
FIG. 9 schematically shows relevant parts of an image pickup apparatus that includes the zoom lens system according to any of the embodiments.

FIG. 9 schematically shows relevant parts of an image pickup apparatus that includes the zoom lens system according to any of the embodiments of the present invention.

The zoom lens systems according to the first to fourth embodiments are image taking lens systems included in image pickup apparatuses such as digital still cameras and silver-halide-film cameras. In the sectional view of each zoom lens system, the object resides on the left (front) side, and the image is formed on the right (rear) side.

When the zoom lens systems of the first to fourth embodiments are used as projection lenses included in projectors or the like, the screen resides on the left side, and the image is projected on the right side.

Referring to each sectional view, the zoom lens system includes a first lens group L1 having a positive refractive power (optical power, or the reciprocal of a focal length), a second lens group L2 having a negative refractive power, a third lens group L3 having a positive refractive power, a fourth lens group L4 having a positive refractive power, and an optical block G, which is an equivalent of, for example, an optical filter, a face plate, a quartz low-pass filter, or an infrared-cut filter.

When the zoom lens system is used as an image taking optical system of a video camera or a digital still camera, an image plane IP functions as the image pickup plane of a solid-state image pickup device (photoelectric conversion element) such as a charge-coupled-device (CCD) sensor or a complementary-metal-oxide-semiconductor (CMOS) sensor.

In each aberration diagram, Fno denotes the f-number, d and g denote the g-line and the d-line, respectively, $\Delta M$ and $\Delta S$ denote the meridional image plane and the sagittal image plane of the d-line, respectively, and $\omega$ denotes the half angle of view. The lateral chromatic aberration is shown in the g-line.

In each embodiment, the zoom positions at the wide-angle end and the telephoto end are zoom positions in which magnification-varying lens groups (the second and third lens groups L2 and L3) reside at extreme ends within a range in which the magnification-varying lens groups can mechanically move along the optical axis.

In each embodiment, the lens groups L1 to L4 move as indicated by respective arrows during zooming from the wide-angle end to the telephoto end.

Specific description will be given below.

The first lens group L1 moves along a locus convex toward the image side in such a manner as to be positioned closer to the object side at the telephoto end than at the wide-angle end. The second lens group L2 also moves along a locus convex toward the image side in such a manner as to be positioned closest to the image side at an approximately middle zoom position. The third lens group L3 monotonically moves toward the object side. The fourth lens group L4 moves along a locus convex toward the object side.

The distance between the first lens group L1 and the second lens group L2 (the distance along the optical axis from the rear end of the first lens group L1 to the front end of the second lens group L2) first decreases but increases afterward during zooming from the wide-angle end to the telephoto end.

In this case, the focal length of the entire system at a zoom position in which the distance between the first lens group L1 and the second lens group L2 is the smallest as d1min is hereinafter denoted as fa.

Further, the lens groups move in such a manner that the distances between the lens groups change as follows. The distance between the first lens group L1 and the second lens group L2 is larger, the distance between the second lens group L2 and the third lens group L3 is smaller, and the distance between the third lens group L3 and the fourth lens group L4 is larger at the telephoto end than at the wide-angle end.

In each embodiment, the lens groups are arranged in such a manner as to produce in the entire system a substantially retrofocus refractive power at the wide-angle end and a substantially telephoto refractive power at the telephoto end. In this manner, a high zoom ratio (about 5) is realized.

Further, zooming performed by moving all of the lens groups facilitates an efficient distribution of the refractive power.

Furthermore, the total optical length can be reduced at the wide-angle end. Therefore, a compact zoom lens system with a high zoom ratio suitable for digital cameras, for example, can be provided.

The zoom lens system of each embodiment is of a rear-focusing type in which focusing is performed by moving the fourth lens group L4 along the optical axis.

At the telephoto end, to focus on a near object from focusing on an object at infinity, the fourth lens group L4 is moved forward as indicated by an arrow 4c. A curve 4a and a curve 4b are loci along which the fourth lens group L4 moves to compensate for variations in the image plane occurring during zooming from the wide-angle end to the telephoto end. The curve 4a indicates the case where the focus is on an object at infinity, and the curve 4b indicates the case where the focus is on a near object.

In each embodiment, the fourth lens group L4, which is of a small weight, is moved for the purpose of focusing. This facilitates quick focusing.

The configurations of the lens groups L1 to L4 in each embodiment will be described in order from the object side to the image side. The first lens group L1 is a cemented lens in which a negative lens element and a positive lens element are cemented together. This cemented lens is a meniscus whose surface on the object side is convex.

The second lens group L2 consists of a negative lens element and a positive lens element. More specifically, the negative lens element has concave surfaces on both the object side and the image side thereof (a biconcave shape). The positive lens element is a meniscus whose surface on the object side is convex. The front and rear surfaces of this negative lens element are aspherical.

In each of the first to third embodiments, the third lens group L3 consists of a cemented lens in which a positive lens element and a negative lens element are cemented together and a biconvex positive lens element. This cemented lens is a meniscus whose surface on the object side is convex.

In the fourth embodiment, the third lens group L3 consists of a biconvex positive lens element and a cemented lens in which a positive lens element and a negative lens element are cemented together. This cemented lens is a meniscus whose surface on the object side is convex.

In each of the first to fourth embodiments, the fourth lens group L4 consists of a single positive lens element that is a meniscus whose surface on the object side is convex.

Each embodiment provides a compact zoom lens system that includes few lens elements in the entire system while realizing high optical performance.

In each embodiment, the first lens group L1 having a positive refractive power is the lens group having the largest effective diameter. The two-lens configuration of the first lens group L1 reduces the number of lens elements, thereby realizing a compact optical system.

Further, the two-lens configuration constituting a cemented lens that includes a positive lens element and a negative lens element contributes well to achromatization, particularly to compensation for lateral chromatic aberration from the wide-angle end to the telephoto end and compensation for longitudinal chromatic aberration at the telephoto end.

The second lens group L2 having a negative refractive power is partially responsible for a magnification-varying function. Since the negative refractive power of the second lens group L2 is large, aberration occurring in the second lens group L2 is also large.

The two-lens configuration of the second lens group L2 enables good aberration compensation while maintaining the large negative refractive power. In spite of having such a simple lens configuration, the second lens group L2 contributes to realization of a zoom lens system having a high zoom ratio and exhibiting high optical performance.

The third lens group L3 having a positive refractive power includes three lens elements in total. In the third lens group L3, the longitudinal chromatic aberration caused by the positive lens elements is compensated for by the negative lens element. This contributes to realizing good optical performance.

The fourth lens group L4 having a positive refractive power efficiently compensates for axial aberrations that have not been compensated for by the third lens group L3 and various off-axial aberrations.

Thus, according to each embodiment, while the number of lens elements is reduced in order to reduce the total length of the zoom lens system, a zoom lens system having a zoom ratio of about 5 and exhibiting bright, high optical performance can be provided.

To realize good optical performance or a compact total size of the zoom lens system according to each embodiment, at least one of the following conditions needs to be satisfied. Various advantages are brought by the respective conditions.

The distances between the first lens group L1 and the second lens group L2 at the wide-angle end and at the telephoto end are defined as d1w and d1t, respectively. The smallest distance between the first lens group L1 and the second lens group L2 is defined as d1min, which is obtained at a halfway point during zooming.

The on-axis thicknesses (the lengths along the optical axis from the object-side surfaces to the image-side surfaces) of the second lens group L2 and the third lens group L3 are defined as TD2 and TD3, respectively. The focal lengths of the entire system at the wide-angle end and at the telephoto end are defined as fw and ft, respectively. The focal length of the second lens group L2 is defined as f2.

In this case, at least one of the following conditional expressions is satisfied:

$$10 < (d1t - d1\min)/(d1w - d1\min) < 90 \quad (1)$$

$$0.28 < (TD2 + TD3)/ft < 0.34 \quad (2)$$

$$-1.9 < f2/fw < -1.3 \quad (3)$$

$$0.005 < (d1w - d1\min)/ft < 0.05 \quad (4)$$

Technical meanings of Conditional Expressions (1) to (4) will be given below.

In the zoom lens system of each embodiment consisting of the four lens groups L1 to L4, the refractive power of the second lens group L2 is set to a sufficiently large value satisfying Conditional Expression (3). This ensures a predetermined zoom ratio (about 5). In this case, it is desirable that the second lens group L2 consists of three or more lens elements.

However, if the second lens group L2 consists of three lens elements, the total length of the zoom lens system increases.

To avoid this, the second lens group L2 of each embodiment consists of a pair of negative lens element and positive lens element to realize a compact zoom lens system.

Such a two-lens configuration of the second lens group L2 may tend to increase the change in field curvature occurring during zooming. This may lead to a difficulty in field curvature compensation at intermediate zoom positions near the wide-angle end.

Therefore, in each embodiment, the distance between the first lens group L1 and the second lens group L2 changes in such a manner as to be reduced slightly at a certain zoom position (a focal length fa) near the wide-angle end but increases largely thereafter.

That is, Conditional Expression (1) is satisfied. Thus, field curvature at zoom positions near the wide-angle end is well compensated for.

If the upper limit of Conditional Expression (1) is exceeded, that is, if the change in distance between the first lens group L1 and the second lens group L2 is too small at zoom positions near the wide-angle end, compensation of field curvature at an intermediate zoom position (a focal length fa) may be difficult.

If the lower limit of Conditional Expression (1) is exceeded, that is, if the change in distance between the first lens group L1 and the second lens group L2 is too large at zoom positions near the wide-angle end, a sufficiently large distance needs to be provided between the first lens group L1 and the second lens group L2 at the wide-angle end. This is undesirable because the entire system becomes large.

Conditional Expression (2) expresses the sum of the on-axis thicknesses of the second lens group L2 and the third lens group L3, the sum being normalized by the focal length at the telephoto end. If the upper limit of Conditional Expression (2) is exceeded, that is, if the on-axis thickness of at least one of the second lens group L2 and the third lens group L3 is too large, the entire system becomes large.

If the lower limit of Conditional Expression (2) is exceeded, that is, if the on-axis thickness of at least one of the second lens group L2 and the third lens group L3 is too small, the air gap between the two lens elements included in the second lens group L2 becomes too small. Consequently, the arrangement of the two lens elements may be difficult. Moreover, compensation of peripheral coma aberration may become undesirably difficult at zoom positions near the wide-angle end.

Conditional Expression (3) expresses the focal length of the second lens group L2 normalized by the focal length of the entire system at the wide-angle end.

If the upper limit of Conditional Expression (3) is exceeded, that is, if the refractive power of the second lens group L2 is too small, the total size of the system becomes undesirably large.

If the lower limit of Conditional Expression (3) is exceeded, that is, if the refractive power of the second lens group L2 is too large, it is difficult to well compensate for the coma flare appearing in the peripheral portion of the image at zoom positions near the wide-angle end.

Conditional Expression (4) concerns the on-axis length from the rear end of the first lens group L1 to the front end of the second lens group L2 at the wide-angle end. Specifically, Conditional Expression (4) concerns the difference between the on-axis length from the rear end of the first lens group L1 to the front end of the second lens group L2 at the wide-angle end and the same on-axis length at a zoom position (focal length fa) in which the aforementioned on-axis length is the smallest, which occurs at a halfway point during zooming. The difference is normalized by the focal length of the entire system at the telephoto end.

If the upper limit of Conditional Expression (4) is exceeded, the distance between the first lens group L1 and the second lens group L2 at the wide-angle end needs to be increased sufficiently. This may undesirably increase the size of the entire system.

If the lower limit of Conditional Expression (4) is exceeded, that is, if the change in the aforementioned distance at zoom positions near the wide-angle end is too small, it is difficult to compensate for the change in the field curvature at an intermediate zoom position (focal length fa).

In each embodiment, more desirable settings of Conditional Expressions (1) to (4) are as follows:

$$30<(d1t-d1\min)/(d1w-d1\min)<70 \quad (1a)$$

$$0.31<(TD2+TD3)/ft<0.34 \quad (2a)$$

$$-1.6<f2/fw<-1.4 \quad (3a)$$

$$0.007<(d1w-d1\min)/ft<0.03 \quad (4a)$$

Additionally, in each embodiment, a lens group having a small refractive power may be provided on the object side relative to the first lens group L1 or on the image side relative to the fourth lens group L4.

Alternatively, a teleconverter lens or a wide converter lens, for example, may be provided on the object side relative to the first lens group L1 or the image side relative to the fourth lens group L4.

As described above, in each embodiment, settings such as the configurations of the lens groups and the method for moving the lens groups during zooming are appropriately considered. Thus, while the number of lens elements is reduced to reduce the total length of the zoom lens system, a zoom lens system having a zoom ratio of about 5, exhibiting bright, high optical performance, and suitable for use in, for example, digital still cameras can be provided.

Next, numerical examples according to the embodiments of the present invention will be given. In each of the numerical examples, i denotes the order of the lens surface counted from the object side, Ri denotes the radius of curvature of the i-th lens surface (the i-th surface), Di denotes the distance between the i-th surface and the (i+1)-th surface, Ni denotes the index of refraction for the d-line, and vi denotes the Abbe number.

The two surfaces closest to the image side constitute the optical block G.

When X is the displacement from the surface vertex in the optical-axis direction at a height h from the optical axis, the shape of an aspherical surface is expressed as follows:

$$X=(h^2/R)/[1+\{1-(1+k)(h/R)^2\}^{1/2}]+Ah^2+Bh^4+Ch^6+Dh^8+Eh^{10}$$

In the above expression, k denotes the conic constant; A, B, C, D, and E are aspherical coefficients in the second, fourth, sixth, eighth, and tenth orders, respectively; and R denotes paraxial radius of curvature.

Additionally, "e-0X" indicates "$\times 10^{-X}$", f denotes the focal length, Fno denotes the f-number, and ω denotes the half angle of view.

Table 5 below shows the relationships between Conditional Expressions (1) to (4) shown above and the numerical examples.

NUMERICAL EXAMPLE 1 f=6.76~32.19 Fno=3.24~5.88 2ω=59.6~13.6
R 1=36.425 D 1=0.90 N 1=1.846660 ν 1=23.9
R 2=20.870 D 2=2.60 N 2=1.804000 ν 2=46.6
R 3=423.219 D 3=variable
* R 4=−120.928 D 4=1.65 N 3=1.848620 ν 3=40.0
* R 5=5.369 D 5=1.97
R 6=9.531 D 6=1.70 N 4=1.922860 ν 4=18.9
R 7=21.305 D 7=variable
* R 8=5.124 D 8=2.30 N 5=1.882997 ν 5=40.8
R 9=16.216 D 9=0.70 N 6=1.808095 ν 6=22.8
R10=4.203 D10=0.52
R11=10.171 D11=1.80 N 7=1.487490 ν 7=70.2
R12=−14.353 D12=variable
R13=12.341 D13=1.80 N 8=1.487490 ν 8=70.2
R14=131.500 D14=variable
R15=∞ D15=1.00 N 9=1.516330 ν 9=64.1
R16=∞
\Focal Length 6.76 14.94 32.19
variable Range\
D 3 1.20 6.79 16.40
D 7 15.09 4.97 1.17
D12 5.85 11.02 21.19
D14 4.69 6.23 3.85

Aspherical Coefficient
4th surface: k=0.00000e+00 A=0 B=1.11274e−05
C=0.00000e+00 D=0.00000e+00 E=0.00000e+00
5th surface: k=−2.79279e+00 A=0 B=1.72320e−03
C=−3.57723e−05 D=8.38261e−07 E=−9.90647e−09
8th surface: k=−2.67014e−01 A=0 B=−9.28612e−05
C=2.70007e−06 D=−1.61409e−07 E=0.00000e+00

TABLE 1

| | Zoom ratio | | 4.76 | |
| --- | --- | --- | --- | --- |
| | Wide angle | Intermediate (d1 min) | Intermediate | Telephoto |
| Focal length | 6.76 | 7.42 | 15.26 | 32.19 |
| Fno | 3.24 | 3.37 | 4.33 | 5.88 |
| Angle of view | 29.8° | 27.6° | 14.2° | 6.8° |
| Image height | 3.88 | 3.88 | 3.88 | 3.88 |
| Total lens length | 44.20 | 42.57 | 46.88 | 58.70 |
| BF | 6.13 | 6.44 | 7.70 | 5.30 |
| D3 | 1.2 | 0.92 | 6.79 | 16.4 |
| D7 | 15.09 | 13.03 | 4.97 | 1.17 |
| D12 | 5.85 | 6.23 | 11.02 | 21.19 |
| D14 | 4.69 | 5.00 | 6.23 | 3.85 |

| Zoom lens group data | | |
| --- | --- | --- |
| Group | Order of front surface | Focal length |
| 1 | 1 | 51.54 |
| 2 | 4 | −10.40 |
| 3 | 8 | 12.30 |
| 4 | 13 | 27.80 |

NUMERICAL EXAMPLE 2 f=6.76~32.35 Fno=3.30~5.69 2ω=59.6~13.6
R 1=33.137 D 1=0.90 N 1=1.846660 ν 1=23.9
R 2=19.192 D 2=2.80 N 2=1.804000 ν 2=46.6
R 3=242.172 D 3=variable
* R 4=−96.261 D 4=1.65 N 3=1.848620 ν 3=40.0
* R 5=5.396 D 5=1.89
R 6=9.316 D 6=1.80 N 4=1.922860 ν 4=18.9
R 7=20.239 D 7=variable
* R 8=5.232 D 8=2.10 N 5=1.882997 ν 5=40.8
R 9=8.992 D 9=0.90 N 6=1.922860 ν 6=18.9
R10=4.476 D10=0.49
R11=10.995 D11=1.70 N 7=1.603112 ν 7=60.6
R12=−17.967 D12=variable
R13=11.887 D13=1.80 N 8=1.487490 ν 8=70.2
R14=91.923 D14=variable
R15=∞ D15=1.00 N 9=1.516330 ν 9=64.1
R16=∞
\Focal Length 6.76 15.26 32.35
variable Range\
D 3 1.20 7.43 16.37
D 7 16.47 5.78 1.68
D12 7.50 12.19 20.99
D14 3.91 5.67 3.96

Aspherical Coefficient
4th surface: k=0.00000e+00 A=0 B=1.61717e−05
C=0.00000e+00 D=0.00000e+00 E=0.00000e+00
5th surface: k=−2.66336e+00 A=0 B=1.62355e−03
C=−3.08981e−05 D=7.08247e−07 E=−8.07232e−09
8th surface: k=−2.08095e−01 A=0 B=−1.18950e−04
C=7.75056e−07 D=−1.84441e−07 E=0.00000e+00

TABLE 2

| | Zoom ratio | | 4.79 | |
| --- | --- | --- | --- | --- |
| | Wide angle | Intermediate (d1 min) | Intermediate | Telephoto |
| Focal length | 6.76 | 7.42 | 15.26 | 32.35 |
| Fno | 3.30 | 3.42 | 4.32 | 5.69 |
| Angle of view | 29.8° | 27.6° | 14.2° | 6.8° |
| Image height | 3.88 | 3.88 | 3.88 | 3.88 |
| Total lens length | 46.43 | 44.55 | 48.42 | 60.36 |
| BF | 5.23 | 5.55 | 6.99 | 5.28 |
| D3 | 1.2 | 0.76 | 7.43 | 16.37 |
| D7 | 16.47 | 14.31 | 5.78 | 1.68 |
| D12 | 7.5 | 7.91 | 12.19 | 20.99 |
| D14 | 3.91 | 4.23 | 5.67 | 3.96 |

| Zoom lens group data | | |
| --- | --- | --- |
| Group | Order of front surface | Focal length |
| 1 | 1 | 49.51 |
| 2 | 4 | −10.19 |
| 3 | 8 | 12.41 |
| 4 | 13 | 27.80 |

NUMERICAL EXAMPLE 3 f=6.76~32.35 Fno=2.93~5.35 2ω=59.6~13.6
R 1=37.196 D 1=0.90 N 1=1.846660 ν 1=23.9
R 2=21.532 D 2=2.70 N 2=1.804000 ν 2=46.6
R 3=440.672 D 3=variable
* R 4=−107.214 D 4=1.65 N 3=1.848620 ν 3=40.0
* R 5=5.516 D 5=1.93
R 6=9.693 D 6=1.80 N 4=1.922860 ν 4=18.9
R 7=21.867 D 7=variable
* R 8=5.118 D 8=2.30 N 5=1.882997 ν 5=40.8
R 9=16.888 D 9=0.70 N 6=1.808095 ν 6=22.8

R10=4.211 D10=0.52
R11=10.186 D11=1.80 N 7=1.487490 ν 7=70.2
R12=−14.473 D12=variable
R13=14.277 D13=1.80 N 8=1.603112 ν 8=60.6
R14=91.600 D14=variable
R15=∞ D15=0.50 N 9=1.516330 ν 9=64.1
R16=∞
\Focal Length 6.76 14.94 32.35
Variable Range\
D 3 1.20 7.61 17.46
D 7 14.85 4.83 1.01
D12 5.25 9.95 20.08
D14 4.84 6.36 3.70

Aspherical Coefficient
4th surface: k=0.00000e+00 A=0 B=6.10931e−06
C=0.00000e+00 D=0.00000e+00 E=0.00000e+00
5th surface: k=−2.94241e+00 A=0 B=1.67564e−03
C=−3.45129e−05 D=7.52887e−07 E=−8.61464e−09
8th surface: k=−2.30344e−01 A=0 B=−1.37478e−04
C=2.42068e−06 D=−2.36697e−07 E=0.00000e+00

TABLE 3

| | Zoom ratio | | 4.79 | |
| --- | --- | --- | --- | --- |
| | Wide angle | Intermediate (d1 min) | Intermediate | Telephoto |
| Focal length | 6.76 | 7.42 | 14.94 | 32.35 |
| Fno | 2.93 | 3.04 | 3.92 | 5.35 |
| Angle of view | 29.8° | 27.6° | 14.5° | 6.8° |
| Image height | 3.88 | 3.88 | 3.88 | 3.88 |
| Total lens length | 43.84 | 41.99 | 46.98 | 59.95 |
| BF | 6.43 | 6.79 | 7.95 | 5.29 |
| D3 | 1.2 | 0.75 | 7.61 | 17.46 |
| D7 | 14.85 | 12.82 | 4.83 | 1.01 |
| D12 | 5.25 | 5.51 | 9.95 | 20.08 |
| D14 | 4.84 | 5.20 | 6.36 | 3.7 |

| Zoom lens group data | | |
| --- | --- | --- |
| Group | Order of front surface | Focal length |
| 1 | 1 | 52.48 |
| 2 | 4 | −10.61 |
| 3 | 8 | 12.25 |
| 4 | 13 | 27.80 |

NUMERICAL EXAMPLE 4 f=6.78~32.36 Fno=3.28~5.71 2ω=56.0~13.2
R 1=24.751 D 1=0.90 N 1=1.846660 ν 1=23.9
R 2=15.330 D 2=3.30 N 2=1.772499 ν 2=49.6
R 3=135.311 D 3=variable
* R 4=−57.014 D 4=1.30 N 3=1.861530 ν 3=40.4
* R 5=5.643 D 5=2.16
R 6=9.619 D 6=1.70 N 4=1.922860 ν 4=18.9
R 7=20.484 D 7=variable
* R 8=7.587 D 8=2.20 N 5=1.519480 ν 5=61.8
R 9=−15.058 D 9=0.32
R10=6.462 D10=1.60 N 6=1.772499 ν 6=49.6
R11=15.488 D11=1.10 N 7=1.846660 ν 7=23.9
R12=4.018 D12=variable
R13=9.638 D13=2.10 N 8=1.487490 ν 8=70.2
R14=−225.919 D14=variable
R15=∞ D15=0.30 N 9=1.516330 ν 9=64.1
R16=∞
\Focal Length 6.78 13.75 32.36
Variable Range\
D 3 1.80 4.99 15.16
D 7 15.15 5.81 1.41
D12 5.19 9.20 15.64
D14 1.45 2.84 1.08

Aspherical Coefficient
4th surface: k=0.00000e+00 A=0 B=2.48921e−04
C=−1.97347e−06 D=0.00000e+00 E=0.00000e+00
5th surface: k=−2.86375e+00 A=0 B=1.85358e−03
C=−2.41558e−05 D=8.96295e−07 E=−1.58748e−08
8th surface: k=−2.33660e+00 A=0 B=1.30026e−04
C=1.26205e−05 D=−1.57731e−06 E=0.00000e+00

TABLE 4

| | Zoom ratio | | 4.77 | |
| --- | --- | --- | --- | --- |
| | Wide angle | Intermediate (d1 min) | Intermediate | Telephoto |
| Focal length | 6.78 | 7.42 | 13.75 | 32.36 |
| Fno | 3.28 | 3.37 | 4.33 | 5.71 |
| Angle of view | 29° | 26.9° | 15.3° | 6.6° |
| Image height | 3.76 | 3.76 | 3.76 | 3.76 |
| Total lens length | 43.28 | 40.04 | 42.54 | 52.99 |
| BF | 4.46 | 4.73 | 5.85 | 4.10 |
| D3 | 1.8 | 0.44 | 4.99 | 15.16 |
| D7 | 15.15 | 11.67 | 5.81 | 1.41 |
| D12 | 5.19 | 6.51 | 9.2 | 15.64 |
| D14 | 1.45 | 1.72 | 2.84 | 1.08 |

| Zoom lens group data | | |
| --- | --- | --- |
| Group | Order of front surface | Focal length |
| 1 | 1 | 41.41 |
| 2 | 4 | −9.92 |
| 3 | 8 | 11.33 |
| 4 | 13 | 19.02 |

TABLE 5

| | Conditional expression | | | |
| --- | --- | --- | --- | --- |
| Numerical example | 1 | 2 | 3 | 4 |
| 1 | 55.3 | 0.33 | −1.54 | 0.009 |
| 2 | 35.2 | 0.33 | −1.51 | 0.014 |
| 3 | 37.0 | 0.33 | −1.57 | 0.014 |
| 4 | 10.9 | 0.32 | −1.46 | 0.042 |

Next, an embodiment of a digital still camera that includes the zoom lens system according to any of the first to fourth embodiments as an image taking optical system will be described with reference to FIG. 9.

In FIG. 9, a camera body 20 is provided with an image taking optical system 21, which is the zoom lens system described in any of the first to fourth embodiments. The camera body 20 houses a solid-state image pickup device (photoelectric conversion element) 22, such as a CCD sensor or a CMOS sensor, that receives the light of an object image formed by the image taking optical system 21. The camera body 20 is also provided with a memory 23 that stores information on the object image that has been subjected to photoelectric conversion performed by the solid-state image pickup device 22, and a viewfinder 24, which is a liquid crystal display panel, for example, through which the object image formed on the solid-state image pickup device 22 is observed.

By applying the zoom lens system according to any of the embodiments of the present invention to an image pickup apparatus such as a digital still camera, a compact image pickup apparatus having high optical performance can be provided.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-157265 filed Jun. 14, 2007, which is hereby incorporated by reference herein in its entirety.

What is claimed is:

1. A zoom lens system comprising, in order from an object side to an image side:
   a first lens group having a positive refractive power;
   a second lens group having a negative refractive power;
   a third lens group having a positive refractive power; and
   a fourth lens group having a positive refractive power,
   wherein a distance between the first lens group and the second lens group becomes the smallest at a halfway point during zooming,
   wherein the first lens group is positioned closer to the object side at a telephoto end than at a wide-angle end,
   wherein the first to fourth lens groups move in such a manner that a distance between the second lens group and the third lens group is smaller and a distance between the third lens group and the fourth lens group is larger at the telephoto end than at the wide-angle end,
   wherein the second lens group consists of, in order from the object side to the image side, a negative lens element and a positive lens element, and
   wherein the following condition is satisfied:

$$10 < (d1t - d1\min)/(d1w - d1\min) < 90$$

where d1w and d1t denote distances between the first lens group and the second lens group at the wide-angle end and at the telephoto end, respectively, and d1min denotes the smallest distance between the first lens group and the second lens group at a halfway point during zooming.

2. The zoom lens system according to claim 1, wherein the following condition is satisfied:

$$0.28 < (TD2 + TD3)/ft < 0.34$$

where TD2 and TD3 denote thicknesses of the second lens group and the third lens group along an optical axis, respectively, and ft denotes a focal length of the entirety of the zoom lens system at the telephoto end.

3. The zoom lens system according to claim 1, wherein the following condition is satisfied:

$$-1.9 < f2/fw < -1.3$$

where f2 denotes a focal length of the second lens group, and fw denotes a focal length of the entirety of the zoom lens system at the wide-angle end.

4. The zoom lens system according to claim 1, wherein the first lens group consists of a cemented lens having a negative lens element and a positive lens element.

5. The zoom lens system according to claim 1,
   wherein the negative lens element of the second lens group has aspherical surfaces on both the object side and the image side thereof, and
   wherein the positive lens element of the second lens group is a meniscus whose surface on the object side is convex.

6. The zoom lens system according to claim 1, wherein the fourth lens group consists of a single positive lens element.

7. The zoom lens system according to claim 1, wherein the third lens group consists of, in order from the object side to the image side, a cemented lens in which a positive lens element and a negative lens element are cemented together and a positive lens element.

8. The zoom lens system according to claim 1, wherein the third lens group consists of, in order from the object side to the image side, a positive lens element and a cemented lens in which a positive lens element and a negative lens element are cemented together.

9. The zoom lens system according to claim 1, wherein the following condition is satisfied:

$$0.005 < (d1w - d1\min)/ft < 0.05$$

where ft denotes a focal length of the entirety of the zoom lens system at the telephoto end.

10. The zoom lens system according to claim 1, wherein the zoom lens system forms an image on a solid-state image pickup device.

11. An image pickup apparatus comprising:
    the zoom lens system according to claim 1; and
    a solid-state image pickup device configured to receive light of an image formed by the zoom lens system.

* * * * *